United States Patent [19]

Jönsson

[11] 4,218,812
[45] Aug. 26, 1980

[54] METHOD AND MEANS FOR RAPID REPLACEMENT OF DAMAGED PIPE SECTIONS

[75] Inventor: Arne Jönsson, Torshälla, Sweden

[73] Assignee: NYBY Bruk AB, Sweden

[21] Appl. No.: 10,421

[22] Filed: Feb. 8, 1979

Related U.S. Application Data

[60] Continuation-in-part of Ser. No. 738,900, Nov. 4, 1976, which is a division of Ser. No. 427,125, Dec. 21, 1973, abandoned.

[30] Foreign Application Priority Data

Dec. 22, 1972 [DE] Fed. Rep. of Germany ....... 2263002

[51] Int. Cl.² .............................................. B22D 19/10
[52] U.S. Cl. ............................. 29/402.12; 29/402.08; 285/223; 138/97; 138/DIG. 8; 138/DIG. 11
[58] Field of Search .................... 285/31, 32, 226, 229, 285/223, 15, 356, 369, 353, 351, 236, 235; 138/103, 97, 178, DIG. 8, DIG. 11; 137/356; 29/402.01, 402.03, 402.08, 402.09, 402.11, 402.12, 402.14, 402.15, 402.19

[56] References Cited

U.S. PATENT DOCUMENTS

| | | | |
|---|---|---|---|
| 398,526 | 2/1889 | McCloskey | 285/223 |
| 1,997,845 | 4/1935 | Adams | 285/223 |
| 2,068,876 | 1/1937 | Snyder, Jr. | 285/223 |
| 2,595,705 | 5/1952 | Rosecrans, Sr. | 285/31 |
| 2,673,100 | 3/1954 | Shumaker | 285/31 |
| 3,488,072 | 1/1970 | Allen et al. | 285/353 |
| 3,552,781 | 1/1971 | Helland | 285/356 |
| 3,776,577 | 12/1973 | Dickey | 285/31 |
| 3,865,410 | 2/1975 | Chen | 285/31 |

FOREIGN PATENT DOCUMENTS

| | | | |
|---|---|---|---|
| 497239 | 11/1950 | Belgium | 285/236 |
| 1128607 | 8/1956 | France | 285/31 |
| 137086 | 6/1919 | United Kingdom | 285/356 |

*Primary Examiner*—Ervin M. Combs
*Assistant Examiner*—V. K. Rising
*Attorney, Agent, or Firm*—Craig & Antonelli

[57] ABSTRACT

Method and means of rapidly repairing damaged portions of conduits and pipes which are difficult or impossible to weld, whereby in the vicinity of the pipes to be maintained prepared replacement pipe sections are stored each together with two associated quick-action unions which comprise an annular coupling body bridging the pipe ends to be joined and having at least one threaded portion and a sealing insert which may be compressed by means of plugs adapted to be screwed into the threaded portion, and after cutting out a portion of the pipe which includes the damaged area and the length of which corresponds substantially to the length of the prepared replacement pipe section the latter is inserted into the pipe line and sealed by rightening and quick-action.

5 Claims, 6 Drawing Figures

METHOD AND MEANS FOR RAPID REPLACEMENT OF DAMAGED PIPE SECTIONS

BACKGROUND AND SUMMARY OF THE INVENTION

This application is a continuation-in-part of U.S. application Ser. No. 738,900, filed Nov. 4, 1976, which application is a division of now abandoned U.S. application Ser. No. 427,125, filed Dec. 21, 1973 abandoned.

The invention relates to a method and means for rapid replacement of damaged pipe sections, in particular damaged pipe sections of oil pipes, for example in ships, and distant-heating, water, gas or similar supply pipes, in particular of large diameter.

The method and means according to the invention are intended mainly for repair work and or applications where it is extremely difficult to provide pipe ends with threads or to weld them, which is for example the case in tankers where pipes are laid along the walls or welding cannot be carried out because of the danger of fire. The invention is also very useful in all cases where personnel trained in making-up pipe connections are not available. Ships, particularly tankers, are again mentioned as examples, in which, for example, when collisions or other accidents occur, pipe sections must be established extremely rapidly.

The problem underlying the invention is to provide a method and means which permit damage to pipes to be repaired as rapidly as possible without requiring welding or a similar lengthy procedure involving the danger of fire and explosion.

According to the invention, this problem is solved in that in the vicinity of pipes to be maintained, prepared replacement pipe sections are stored each together with two adapted quick-action unions which each comprise a tubular coupling body bridging the pipe ends to be joined and having a threaded portion at least at one end and at least one resiliently deformable sealing insert which may be compressed by means of plugs adapted to be screwed into the threaded portion of the coupling body.

The method according to the invention has the advantage that the storing of such prepared replacement pipe sections in the vicinity of the conduits or pipes to be maintained makes it possible to replace very rapidly any portion of the pipe which may be damaged by fracture or by any accidents. For this purpose, a portion of the pipe including the damaged area and having a length which corresponds as accurately as possible to the prepared replacement pipe section available is cut out of the pipe and the replacement pipe section provided with two quick-action unions inserted into the pipe and sealed by tightening the unions.

In joining pipes without welding the nature of the union at the abutting pipe ends is of decisive importance. The requirements made of such a union are primarily a simple construction, easy applicaton and removal, a perfect seal, high resistance to corrosion and adequate strength.

A further object of the present invention is thus to provide a union which may be rapidly fitted and rapidly removed, is of simple structure but the design of which nevertheless meets the hardest requirements.

The union according to the invention is formed by a tubular coupling body which bridges the tube ends to be joined and comprises a thread cut at its one end and comprises at the other end a stop projecting into the interior of the coupling body, by a tubular insert of resiliently deformable material which is adapted to be inserted into the coupling body and the pipe ends and matches the bore of the coupling body and has a length which reaches from the stop to the start of the thread, by a rigid intermediate ring bearing on the resilient insert and by a threaded plug adapted to be screwed into the thread of the coupling body.

According to the invention, the stop in the coupling body may be formed by a second plug which is adapted to be screwed into said body.

It has been found particularly advantageous to divide the resiliently deformable insert into two parts between which a rigid ring is interposed which is preferably so dimensioned that it bridges the abutting ends of the pipes to be joined. The rigid intermediate ring preferably has the same diameter dimensions as the resilient insert. The rigid intermediate ring may also be fixedly connected to the coupling body or made integral therewith when two plugs are provided. It may also be advantageous to divide the insert into more than two parts and correspondingly provides plurality of rigid intermediate rings, thus making uniform the pressure exerted on the individual regions of the insert in the axial direction by the plug or plugs. Of course, in the case where only one plug is present the intermediate rings must all be loose, i.e. axially displaceable, and in the case where two plugs are provided the center intermediate ring may be fixedly connected to the coupling body.

The prepared replacement pipe sections preferably comprise two substantially straight end portions whose center axes are in alignment and between said end portions a loop-shaped, U-shaped, or lyre-shaped intermediate portion.

According to the invention, the loop-shaped pipe bends of the intermediate portion comprise arcs curved in opposite directions whose arrangement and radii of curvature are so chosen that on resilient compression of the replacement pipe section by forces acting in the direction of the center axis of the end portions on the latter said end portions remain in alignment with each other, thereby precluding non-uniform deformation of the resilient inserts of the quick-action unions which non-uniform deformation could result in leakage from the repaired pipe section.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
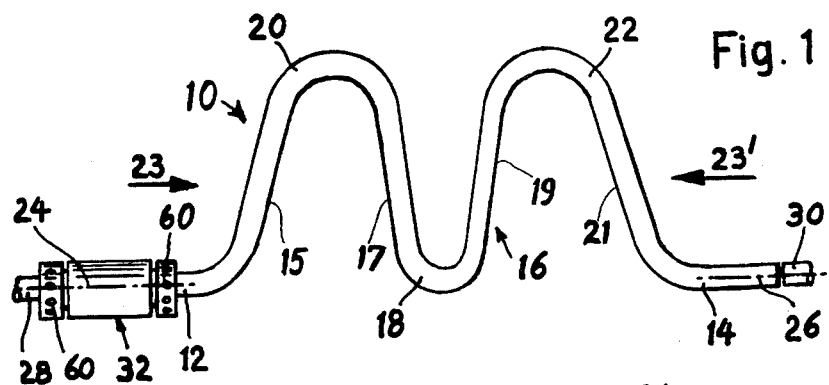
FIG. 1 shows a replacement pipe section according to the invention in side elevation in the assembled state, the quick-action union being removed on one side and the pipe being only partially indicated.

The replacement pipe section 10 according to FIG. 1 comprises two substantially straight end portions 12, 14 and an intermediate portion 16 which is disposed between said end portions and comprises a relatively short, i.e. a relatively highly curved, center arc or bend 18 and two less highly curved outer arcs or bends 20, 22. More particularly, as further shown in FIG. 1, the bends or arcs 18, 20, 22 are alternately disposed with respect to straight segments 15, 17, 19, and 21. These straight segments 15, 17, 19, and 21 are of essentially equal length, and are associated with the bends 18, 20 and 22 so as to position bends 20 and 22, which adjoin the straight end portions 12, 14, respectively, an equal distance to the same side of the aligned center axes 24, 26, while bend 18 faces in an opposite direction with respect to the bends 20, 22 and is located approximately at the center axes 24, 26.

As a result of the different curvature of the arcs or bends 18, 20 and 22 and the relative positioning by the straight segments 15, 17, 19, 21, it is achieved that the replacement pipe section 10 is resiliently compressible in the direction of the arrows 23, 23' without the aligned pipe center axes 24 and 26 of the end portions 12 and 14 appreciably coming out of alignment, and consequently, when the replacement pipe section 10 is resiliently compressed, the pipe center axes 24 and 26 of the end portions 12 and 14 substantially retain their directional and do not distort with respect to the center axis of the adjacent end portions 28 and 30 of the pipe to be repaired.

Figure 5:
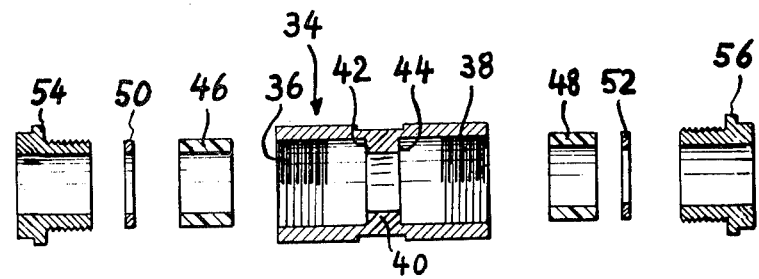
FIG. 5 is an exploded sectional view of a quick-action union made according to the invention.

Of the two quick-action unions associated with the replacement pipe section 10, only the left one is illustrated in FIG. 1, being denoted by the reference numeral 32. As illustrated in detail in FIG. 5, this union comprises a tubular coupling body 34 which has at its ends two threaded portions 36 and 38 and the center region of which comprises a portion 40 of reduced diameter. The portion 40 forms annular bearing surfaces 42, 44 for two resilient inserts 46, 48 which may be introduced from both sides into the coupling body 34 and are resiliently deformable with interposition of preferably steel washers 50 and 52 by means of stoppers or plugs 54 and 56 to obtain a sealing.

Figure 2:
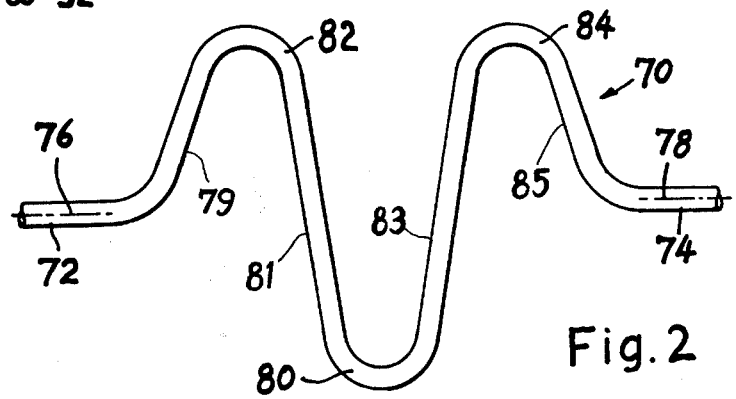
FIG. 2 shows a modified form of the pipe section according to the invention in side elevation.

FIG. 2 shows a replacement pipe section 70 comprising two substantially straight end portions 72 and 74 whose center axes 76 and 78 are in alignment. The curvatures of the arcs 80, 82 and 84 are made substantially equal but the center arc 80 extends beyond the line joining the pipe center axes 76 and 77 downwardly substantially the same amount as the arc portions 82, 84 extend upwardly beyond said connecting line by virtue of the alternately disposed straight segments 79, 81, 83, 85 which interconnect the bends 80, 82, 84 in the manner shown in FIG. 2, the straight segments 79 and 85 being essentially equal in length as are the straight segments 81, 83. With the replacement pipe section 70 according in FIG. 2, when resiliently compressed in the direction of their center axes 76, 78 the end portions 72, 74 remain substantially in alignment.

Figure 3:
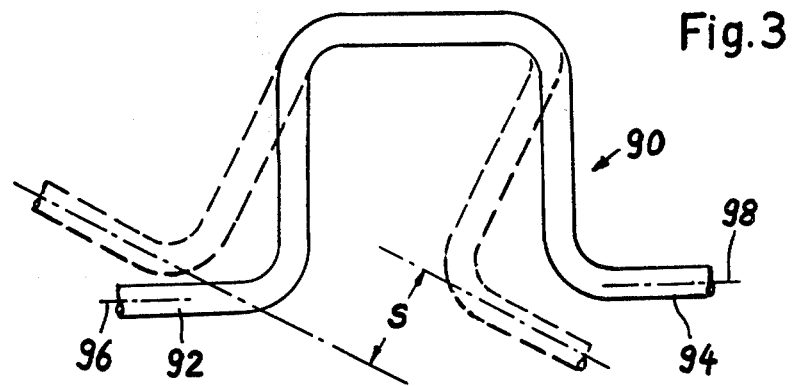
FIG. 3 is a further modified embodiment of the pipe section according to the invention in side elevation.

FIG. 3 shows a U-shaped replacement pipe section 90. This replacement pipe section 90 comprises two end portions 92, 94 whose center axes 96, 98 are in alignment with each other in the condition illustrated in continuous lines. This pipe section 90 is particularly advantageous when, after the defect pipe section has been removed, the pipe ends of the conduit to be repaired are no longer in alignment but are offset parallel to each other, which can occur when the fracture in the conduit has been caused by lateral forces acting thereon and producing high stresses therein. In this case the pipe ends 92, 94 can be brought by plastic deformation into the form shown in dashed line in FIG. 3, offset an amount denoted by S in FIG. 3.

Figure 4:
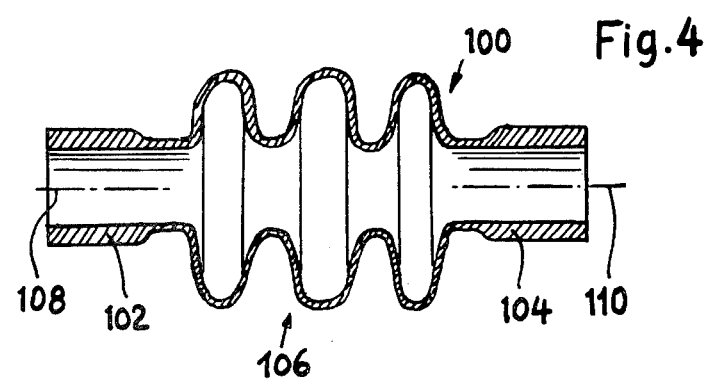
FIG. 4 is a longitudinal section of a modified form of the pipe section.

FIG. 4 shows a further embodiment of the replacement pipe section denoted generally by the reference numeral 100. This replacement pipe section comprises two thick-walled straight end portions 102 and 104 and an intermediate portion denoted generally by 106 and constructed as corrugated pipe. This corrugated intermediate section 106 has thinner walls than the end portions 102 and 104 on which the quick-action unions are arranged. The corrugated portion 106 permits elastic compression of the replacement pipe section 100 in the direction of the center axes 103 and 110 of the end portions 102 and 104 without said end portions coming out of alignment.

Figure 6:
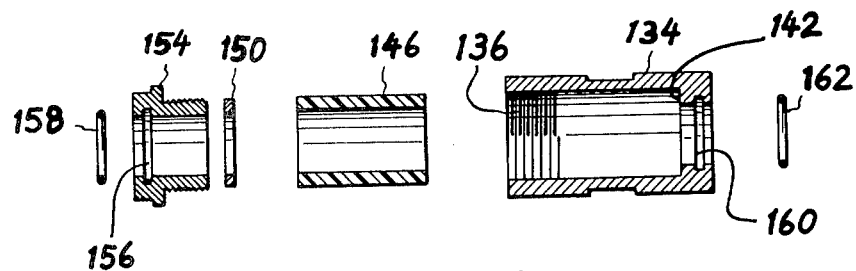
FIG. 6 shows a modified embodiment of the union according to FIG. 5.

FIG. 6 shows a modified embodiment of the quick-action coupling; the coupling body 134 comprises a threaded portion 136 on only one side. The other end of the body 134 has a reduced internal diameter which forms a stop 142 for a resiliently deformable sealing insert 146. Said resiliently deformable insert 146 may be compressed via a washer 150 by means of a threaded plug 154. Cut internally in the threaded plug 154 is an annular groove 156 for a O-ring 158 which serves as an additional seal. Analogously, an annular groove 160 for a further O-ring seal 162 is cut into the coupling body 134. The quick-action union 134 has the advantage that only one plug need be screwed in. This union is thus of simpler construction. It does not, however, comprise a constricted center portion which is the case of the union 34 illustrated in FIG. 5 bridges the joint between the two pipe ends to be connected and simultaneously effects adjustment of said ends.

The plugs 54, 56 and 154 are provided at their periphery with holes 60 for applying tools for screwing the plugs in and out.

One example of the application of the invention will now be described.

In a tanker a pipe leading to a machine with essential functions has burst. After turning of the flow in the pipe, a section of the pipe having a length of 2 meters and containing the fracture is cut out. A quick-action union according to the invention is placed over each of the cut pipe ends. A replacement pipe section also having a length of 2 meters was then placed in the gap in the pipe and the unions pushed over the abutting ends and tightened and sealed by screwing in the plugs. Only a few minutes were needed to carry out the repair and it was then possible to switch the flow in the pipe on again.

The example is intended to explain the invention and is not a limitation of the scope thereof.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A method for rapidly repairing damaged portions of conduits snd pipes which are difficult or impossible to weld, such as oil pipes, in particular on oil tankers, and long-distance heating pipes, water, gas or similar supply pipes, in particular of large diameter, said method comprising storing in the vicinity of the pipe to be repaired prepared replacement pipe sections, each replacement pipe section having two substantially straight end portions which are provided with two associated quick-action unions, said straight end portions being parallel to each other and interconnected by a resilient intermediate portion formed of a plurality of bends extending substantially in a common plane aligned with the center axis of said straight end portions, each of said straight end portions adjoining one of said plurality of bends, each of said adjoining bends extending from the center axis of a respective straight end portion in the same direction and having about the same size and the same radius of curvature, and said resilient intermediate portion having a middle bend between said adjoining bends which is of the same curvature as said adjoining bends, said middle bend being connected to each of said adjoining bends by a straight segment extending from said adjoining bends so far beyond the center axis of said straight end portions as to enable movement of said two substantially straight end portions towards and away from each other while remaining parallel to each other, and each union comprising (a) an annular coupling body for bridging the pipe ends to be joined, said annular coupling body having at least one threaded portion, (b) a sealing insert formed from a deformable material, and (c) a sealing insert formed from a deformable material, and (c) a coupling member adapted to be screwed into the threaded portion of said annular coupling body and thereby compress said sealing insert into pipe sealing engagement, said process further comprising:

cutting out the damaged portion of the pipe to be repaired, the length of the damaged portion of pipe cut out substantially corresponding to the length of the prepared replacement pipe section, inserting between the ends of the remaining parts of the damaged pipe said prepared replacement pipe section with the substantially straight end portions thereof in substantial alignment with the ends of the remaining parts of the damaged pipe, and establishing a sealed connection between said prepared replacement pipe section and the remaining parts of the damaged pipe.

2. The method of claim 1, wherein said sealed connection is established by arranging each quick-action union in a position bridging the associated end portion of said replacement pipe section and one end of the remaining part of the damaged pipe, and thereafter tightening the quick-action unions on each end of said prepared replacement pipe section.

3. A process for repairing a damaged pipe without threading or welding portions of the damaged pipe, said process comprising removing the damaged portion of the pipe so as to form a gap in the pipe defined on each end by intermediate pipe ends, inserting into said gap a replacement pipe section of substantially the same diameter as the damaged pipe comprising flexible conduit means defining two substantially straight end portions and a quick-action union associated with each of said substantially rectilinear end portions, said straight end portions being parallel to each other and interconnected by a resilient intermediate portion formed of a plurality of bends extending substantially in a common plane aligned with the center axis of said straight end portion, said straight end portions being parallel to each other and interconnected by a resilient intermediate portion formed of a plurality of bends extending substantially in a common plane aligned with the center axis of said straight end portions, each of said straight end portions adjoining a bend, each said adjoining bend being positioned a first distance from the center axis of said straight end portions in the same direction and having about the same size and the same radius of curvature, and said resilient intermediate portion having a middle bend that is more highly curved than said adjoining bends, said middle bend being positioned facing in the opposite direction from said adjoining bends and being displaced a second distance substantially equal to said first distance so far beyond the center axis of said straight end portions in an opposite direction with respect to the position of said adjoining bends as to enable movement of said two substantially straight end portions towards and away from each other while remaining parallel to each other, and each quick-action union comprising deformable means for mechanically sealing the associated intermediate pipe end to said flexible conduit means without welding or threading of said associated intermediate pipe end, said process further comprising mechanically sealing each straight end portion of said replacement pipe section to an associated intermediate pipe end without welding or threading the intermediate pipe end by means of respective quick-action unions.

4. A method for rapidly repairing damaged portions of conduits and pipes which are difficult or impossible to weld, such as oil pipes, in particular on oil tankers, and long-distance heating pipes, water, gas or similar supply pipes, in particular of large diameter, said method comprising storing in the vicinity of the pipe to be repaired prepared replacement pipe sections, each replacement pipe section having two substantially straight end portions being provided with two associated quick-action unions, said straight end portions being parallel to each other and interconnected by a resilient intermediate portion formed of a plurality of straight segments and a plurality of bends alternately disposed with respect to said straight segments, said bends extending substantially in a common plane aligned with the center axis of said straight portions, each of said straight end portions adjoining one of said plurality of bends, said adjoining bends extending from the center axis the same distance in the same direction and having the same size and radius of curvature and said plurality of bends including a middle bend located between said adjoining bends and connected thereto at each end by one of said straight segments, said middle bend being more highly curved than said adjoining bends and being positioned approximately at said center axis facing in a direction opposite to said adjoining bends so as to enable movement of said two substantially straight end portions towards and away from each other while remaining parallel to each other, and each union comprising (a) an annular coupling body for bridging the pipe ends to be joined, said annular coupling body having at least one threaded portion, (b) a sealing insert formed from a deformable material, and (c) a coupling member adapted to be screwed into the threaded portion of said annular coupling body and thereby compress said sealing insert into pipe sealing engagement, said process further comprising:

cutting out the damaged portion of the pipe to be repaired, the length of the damaged portion of pipe cut out substantially corresponding to the length of the prepared replacement pipe section, inserting between the ends of the remaining parts of the damaged pipe said prepared replacement pipe section with the substantially straight end portions thereof in substantial alignment with the ends of the remaining parts of the damaged pipe, and establishing a sealed connection between said prepared replacement pipe section and the remaining parts of the damaged pipe.

5. A process for repairing a damaged pipe without threading or welding portions of the damaged pipe, said process comprising removing the damaged portion of the pipe so as to form a gap in the pipe defined on each end by intermediate pipe ends, inserting into said gap a replacement pipe section of substantially the same diameter as the damaged pipe comprising flexible conduit means defining two substantially straight end portions and a quick-action union associated with each of said substantially straight end portions, said straight end portions being parallel to each other and said intermediate pipe ends and interconnected by a resilient intermediate portion formed of a plurality of straight segments and a plurality of bends alternately disposed with respect to said straight segments, said bends extending substantially in a common plane aligned with the center axis of said straight portions, each of said straight end portions adjoining one of said plurality of bends, said adjoining bends extending from the center axis the same distance in the same direction and having the same size and radius of curvature and said plurality of bends including a middle bend located between said adjoining bends and connected thereto at each end by one of said straight segments, said middle bend being more highly curved than said adjoining bends and being positioned approximately at said center axis facing in a direction opposite to said adjoining bends so as to enable movement of said two substantially straight end portions towards and away from each other while remaining parallel to each other, and each union comprising (a) an annular coupling body for bridging the pipe ends to be joined, said annular coupling body having at least one threaded portion, (b) a sealing insert formed from a deformable material, and (c) a coupling member adapted to be screwed into the threaded portion of said annular coupling body and thereby compress said sealing insert into pipe sealing engagement, said process further comprising:

cutting out the damaged portion of the pipe to be repaired, the length of the damaged portion of pipe cut out substantially corresponding to the length of the prepared replacement pipe section, inserting between the ends of the remaining parts of the damaged pipe said prepared replacement pipe section with the substantially straight end portions thereof in substantial alignment with the ends of the remaining parts of the damaged pipe, and establishing a sealed connection between said prepared replacement pipe section and the remaining parts of the damaged pipe.

* * * * *